(12) United States Patent
Fouda et al.

(10) Patent No.: US 11,814,945 B2
(45) Date of Patent: Nov. 14, 2023

(54) DOWNHOLE NESTED PIPE INSPECTION USING HYBRID FREQUENCY AND TIME DOMAIN LOGGING TECHNIQUE

(71) Applicant: Halliburton Energy Services, Inc., Houston, TX (US)

(72) Inventors: Ahmed Fouda, Houston, TX (US); Junwen Dai, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 146 days.

(21) Appl. No.: 17/530,556

(22) Filed: Nov. 19, 2021

(65) Prior Publication Data

US 2023/0160294 A1    May 25, 2023

(51) Int. Cl.
*E21B 47/00* (2012.01)
*G01V 3/38* (2006.01)
*G01V 3/28* (2006.01)
*F16L 55/28* (2006.01)

(52) U.S. Cl.
CPC .............. *E21B 47/00* (2013.01); *F16L 55/28* (2013.01); *G01V 3/28* (2013.01); *G01V 3/38* (2013.01); *E21B 2200/20* (2020.05)

(58) Field of Classification Search
CPC ...... E21B 47/00; E21B 2200/20; F16L 55/28; G01V 3/28; G01V 3/38
See application file for complete search history.

(56) References Cited

U.S. PATENT DOCUMENTS

| | | | |
|---|---|---|---|
| 7,960,969 B2 | 6/2011 | Mouget et al. | |
| 9,715,034 B2 | 7/2017 | Omeragic et al. | |
| 9,983,173 B2 | 5/2018 | Aslanyan et al. | |
| 10,502,044 B2 | 12/2019 | Fouda et al. | |
| 2015/0015265 A1 | 1/2015 | Seydoux et al. | |
| 2015/0127274 A1 | 5/2015 | Legendre et al. | |
| 2017/0114628 A1 | 4/2017 | Khalaj Amineh et al. | |
| 2018/0106763 A1 | 4/2018 | Fouda et al. | |
| 2018/0106764 A1* | 4/2018 | Fouda | G01V 3/28 |
| 2019/0040734 A1* | 2/2019 | Donderici | E21B 47/092 |
| 2019/0086320 A1 | 3/2019 | Guner et al. | |
| 2019/0162870 A1 | 5/2019 | San Martin et al. | |
| 2019/0369285 A1* | 12/2019 | Fouda | E21B 47/085 |
| 2020/0081148 A1 | 3/2020 | Capoglu et al. | |
| 2020/0200940 A1* | 6/2020 | Fouda | G01N 27/9046 |

(Continued)

FOREIGN PATENT DOCUMENTS

| | | |
|---|---|---|
| EP | 0873465 B1 | 3/2002 |
| WO | WO 2018/031047 A1 | 2/2018 |
| WO | WO 2018/222209 A1 | 12/2018 |

OTHER PUBLICATIONS

David D. Clark, "Data and Computer Communications" (Year: 1988).*

(Continued)

*Primary Examiner* — Natalie Huls
*Assistant Examiner* — Sharad Timilsina
(74) *Attorney, Agent, or Firm* — John Wustenberg; C. Tumey Law Group PLLC

(57) ABSTRACT

Electromagnetic logging tools to inspect nested pipes using hybrid frequency- and time-domain logging techniques are disclosed. The disclosed logging system and processing workflows combine frequency-domain and time-domain techniques to overcome the disadvantages of using frequency-domain or time domain tools in isolation.

20 Claims, 11 Drawing Sheets

(56) References Cited

U.S. PATENT DOCUMENTS

2020/0333500 A1   10/2020   Fouda et al.
2021/0239874 A1    8/2021   Fouda
2021/0349231 A1   11/2021   Griffing et al.

OTHER PUBLICATIONS

Search Report and Written Opinion issued for International Patent Application No. PCT/US2021/060009, dated Aug. 11, 2022, 10 pages.
Search Report and Written Opinion issued for International Patent Application No. PCT/US2021/061324, dated Aug. 17, 2022, 11 pages.
Search Report and Written Opinion issued for International Patent Application No. PCT/US2021/061327, dated Aug. 24, 2022, 12 pages.
Garcia et al., "Successful Application of a New Electromagnetic corrosion Tool for Well Integrity Evaluation in Old Wells Completed with Reduced Diameter Tubular," International Petroleum Technology Conference, Beijing, China, Mar. 26-28, 2013.
Haugland, "Fundamental Analysis of the Remote-Field Eddy-Current Effect," IEEE Transactions on Magnetics, vol. 32, No. 4, Jul. 1996, pp. 3195-3211.
Yu, et al., "An Advanced Technique for Simultaneous in Situ Inspection of Multiple Metallic Tubulars," SPE/ICoTA Well Intervention Conference and Exhibition, The Woodlands, Texas, USA, Mar. 2019.

* cited by examiner

DOWNHOLE NESTED PIPE INSPECTION USING HYBRID FREQUENCY AND TIME DOMAIN LOGGING TECHNIQUE

FIELD OF THE INVENTION

The present invention relates generally to hydrocarbon exploration using electromagnetic logging and, more specifically, to methods and systems to inspect nested downhole pipes using a hybrid frequency- and time-domain logging techniques.

BACKGROUND

Electromagnetic ("EM") techniques are commonly used to monitor the condition of pipes in oil and gas wellbores, including various kinds of casing strings and tubing. One common EM technique is the eddy current technique. In the eddy current technique, when the transmitter coil emits the primary transient EM fields, eddy currents are induced in the casing. These eddy currents then produce secondary fields which are received along with the primary fields by the receiver coil. The acquired data can be then employed to perform evaluation of the multiple pipes.

A typical wellbore diagram comprises multiple nested pipes. The number of casing layers used depends on the characteristics of the subsurface and can vary from well to well. Depending on a well's design, well construction can have between two and four main components. These components include conductor, surface, intermediate and production casings. After completion of the well, a tubing may be inserted to pump hydrocarbon products. When the EM tool is used to monitor the pipe condition, the log is affected by many factors including, for example, the pipe electrical properties and pipe geometry including number, size, and shape.

Two different eddy current techniques are used to inspect multiple nested pipes, namely, frequency-domain techniques/tools and time-domain techniques/tools. Frequency-domain tools provide high vertical resolution for inner pipes. However, the frequency-domain tools suffer degraded vertical resolution for outer pipes because of the need to use longer transmitter-receiver spacings to penetrate deeper into the pipes. On the other hand, time-domain tools require impractically high dynamic range and sampling rates to sample both the leading portion of the decay response that is sensitive to inner pipes, and the trailing portion that is sensitive to both inner and outer pipes.

DESCRIPTION OF ILLUSTRATIVE EMBODIMENTS

Illustrative embodiments and related methods of the present disclosure are described below as they might be employed to inspect nested tubulars using hybrid frequency- and time-domain logging techniques. In the interest of clarity, not all features of an actual implementation or methodology are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methodologies of the invention will become apparent from consideration of the following description and drawings.

Exemplary embodiments of the present invention are directed to systems and methods to inspect nested pipes using hybrid frequency- and time-domain logging techniques. Embodiments of the present disclosure mitigate the shortcomings of both frequency-domain and time-domain tools by combining the best of both tools in one hybrid tool and/or processing workflow. By combining both frequency-domain and time-domain measurements, long spacing frequency-domain receivers are substituted with the trailing portions of the time-domain responses, thus improving the vertical resolution on outer pipes. Further, the leading portions of the time-domain responses are substituted with the short-spacing frequency-domain measurements, thus relaxing dynamic range and sampling rate requirements associated with time-domain tools.

In a generalized method of the present disclosure, a hybrid frequency-domain and time-domain logging inspection tool obtains one or more composite (or combined) waveforms. These composite waveforms include a continuous wave response in the frequency domain, and a pulse response in the time domain. A model-based inversion is then applied to process the composite waveform. Thereafter, one or more pipe parameters are determined using the model-based inversion, and these parameters are used to determine the condition/integrity of the downhole pipes.

Figure 1:
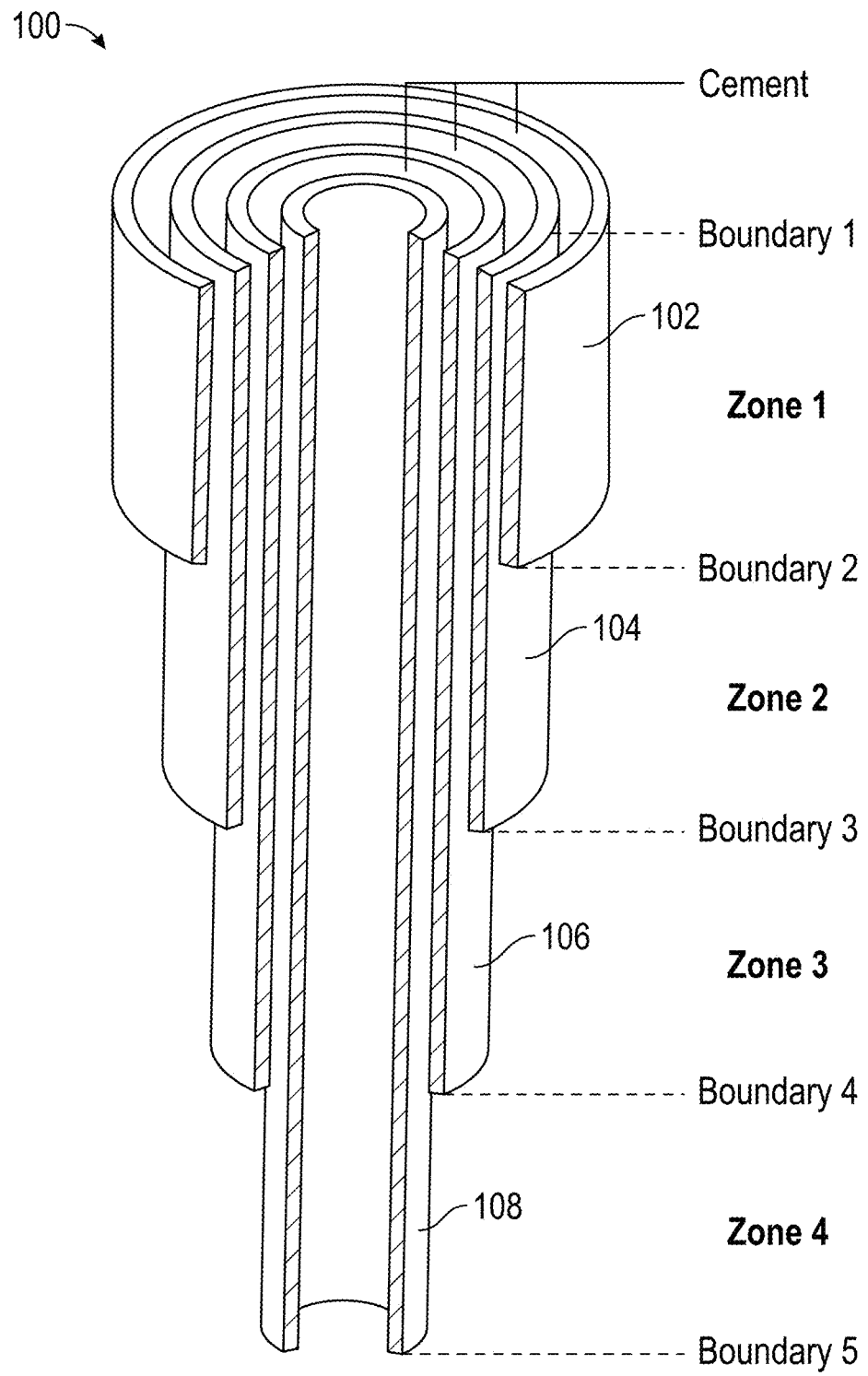
FIG. 1 is a well casing diagram useful to illustrate principles of the present disclosure.

FIG. 1 is a well casing diagram. As can be seen, the well casing 100 consists of four pipes with different lengths and four zones with a different number of concentric pipes. As previously mentioned, the number of casing layers used depends on the characteristics of the subsurface and can vary from well to well. In this example, the components include a conductor casing 102, surface casing 104, intermediate casing 106 and production casings 108. Each casing string defines a zone 1, zone 2, zone 3 and zone 4. When the EM tool is used to monitor the pipe condition, the log is affected by many factors, for instance, the pipe electrical properties and pipe geometry including number, size, and shape.

Still referencing FIG. 1, Frequency-domain inspection tools provide high vertical resolution for inner pipes (e.g., intermediate casing 106 and production casing 108), but suffer degraded vertical resolution for outer pipes (e.g., conductor casing 102 and surface casing 104) because of the need to use longer transmitter-receiver spacing to penetrate deeper into the pipes. Time-domain tools on the other hand, require impractically high dynamic range and sampling rate to sample both the leading portion of the decay response that is sensitive to inner pipes (e.g., intermediate casing 106 and production casing 108), in addition to the trailing portion that is sensitive to both inner and outer pipes.

Accordingly, the illustrative embodiments of the present disclosure and processing workflows combine the best of frequency- and time-domain tools in order to mitigate the shortcomings of each individually. In the disclosed hybrid inspection tools, the signal generator excites the transmitter coil with a composite waveform comprising a continuous wave having at least one frequency and a pulse (time domain). The receiver circuitry of the hybrid inspection tool records the receiver voltage in response to the excitation waveform. A processing unit, using the disclosed methods herein, then determines at least one pipe parameter based on the recorded receiver voltage. Therefore, the present disclosure provides methods to combine frequency-domain and time-domain data to get the best of both measurements, while also providing methods to process the hybrid frequency/time-domain data using hybrid model-based inversion.

Figure 2B:
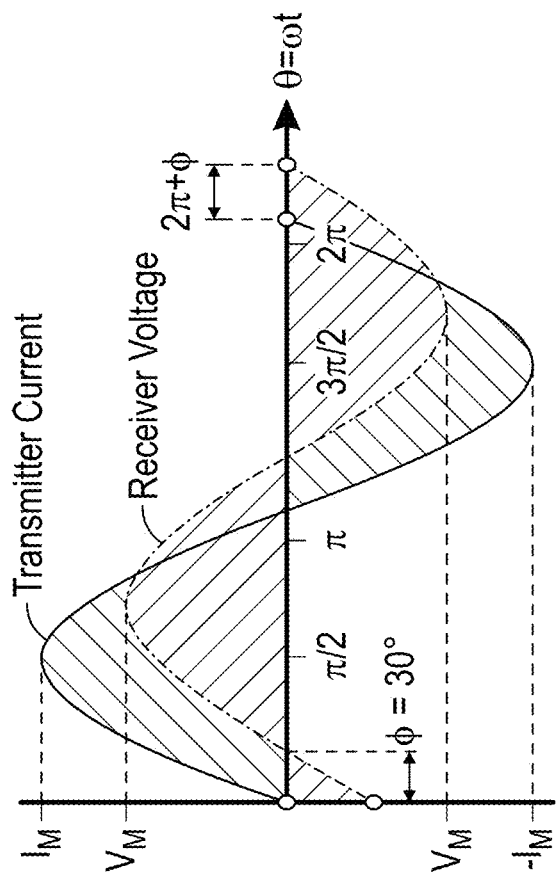
FIG. 2B is a graph showing continuous transmitter and receiver wave responses in the frequency domain.
Figure 2A:
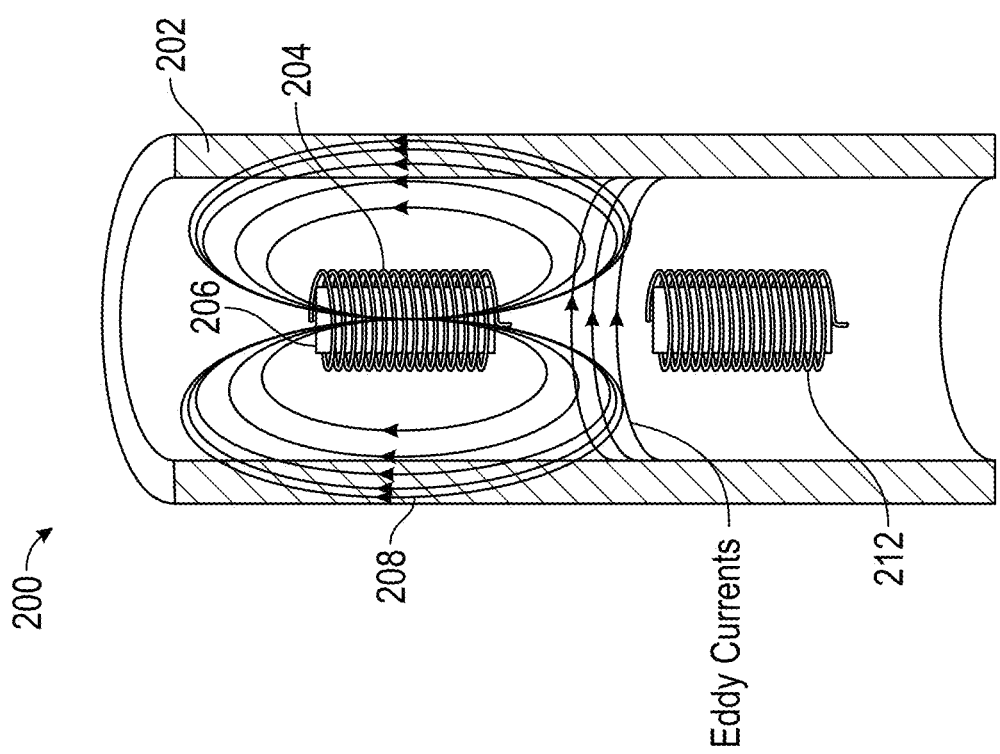
FIG. 2A is a view of a frequency-domain tool positioned inside a downhole pipe.

FIGS. 2A-2B are useful to further describe the advantages of the present disclosure. FIG. 2A is a view of a frequency-domain tool positioned inside a downhole pipe. Such tools typically have the following adjustable tool parameters: transmitter-receiver spacing, transmitter/receiver lengths, excitation current power, excitation current frequency, and logging speed. FIG. 2B is a graph showing continuous transmitter and receiver wave responses in the frequency domain. The eddy current effect on the EM wave can be applied to develop a tool to characterize the pipe around the borehole. As shown in FIG. 2A, inspection tool 200 is positioned inside a downhole tubular 202. In certain frequency-domain eddy current techniques, transmitter coil 204 (surrounding magnetic core 206) is fed by a continuous sinusoidal signal, producing primary fields 208 that illuminate the pipe(s) 202.

The primary fields produce eddy currents in pipes 202. These eddy currents, in turn, produce secondary fields that are sensed along with primary fields 208 in receiver coils 212 (e.g., may or may not surrounding a magnetic core) that are placed at a distance from transmitter 204. High-frequency/short-spacing receivers are employed for inner pipe inspection. In certain examples, frequency domain responses may be acquired using short spacing receivers such as, for example, receivers which are spaced apart by less than 1 ft or 3 ft. The short spacing receivers are designed such that a change in the thickness of an inner pipe causes a substantially larger change in the receiver signal as compared to the receiver signal change caused by a similar change in an outer pipe thickness (thus making the short spacing receiver more sensitive to inner pipes). Here, the "substantially larger" change in the receiver signal may be, for example, a signal change in the range of 5 to 15 percent. A "similar" change in pipe thickness, for example, would be a change within the range of 10 percent. In like manner, low-frequency/long-spacing receivers are employed for outer pipe inspection because they are designed such that a change in the thickness of the outer pipe causes a substantially larger change in the receiver signal as compared to the receiver signal change cause by a similar thickness change in an inner pipe, thus making it more sensitive to outer pipes. Long spacing receivers may be, for example, receivers which are spaced apart by 1 to 10 feet. Characterization of the pipes is performed by measuring and processing these fields.

Figure 3:
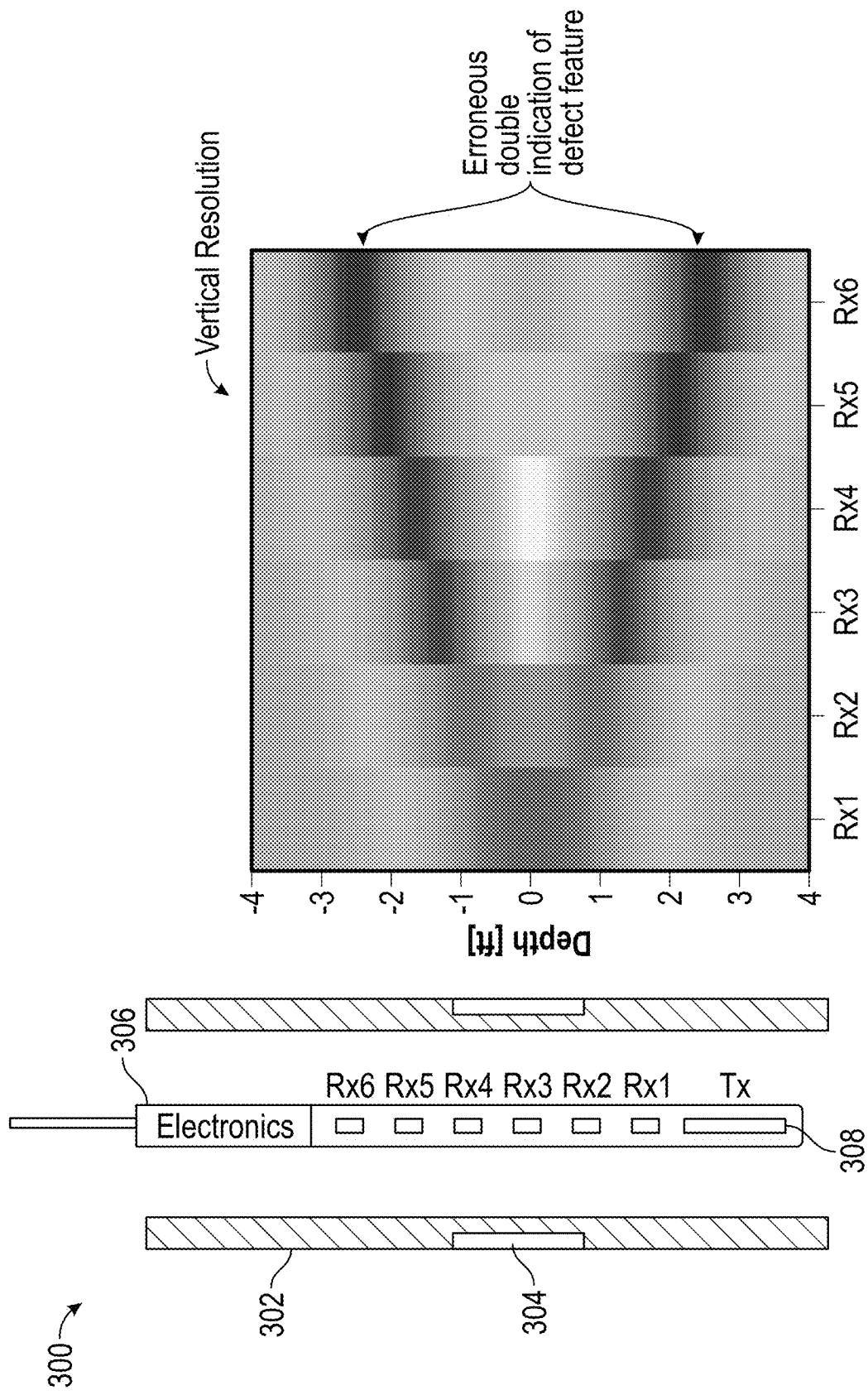
FIG. 3 shows the limitations of frequency-domain inspection tools and its associated typical defect response with double indication of features.

As the transmitter/receiver spacing increases, receiver 212 becomes more sensitive to outer pipes. However, this increased spacing comes at the expense of degraded vertical resolution. One feature on the pipes will appear at two indications on the frequency-domain data log with the distance between the two peaks being proportional to the transmitter/receiver spacing—this defect phenomena is illustrated in FIG. 3, which shows the limitations of frequency-domain inspection tools and its associated typical defect response with double indication of features. As shown, frequency domain inspection tool 300 is positioned inside pipe 302 (which has a defect 304). Inspection tool 300 includes electronics 306, receivers Rx1-6 and transmitter 308. The associated degraded vertical resolution generated by tool 300 is also shown which includes the erroneous double indication of features 310 which gets increasingly worse as the receivers are further removed from transmitter 308.

Figure 4B:
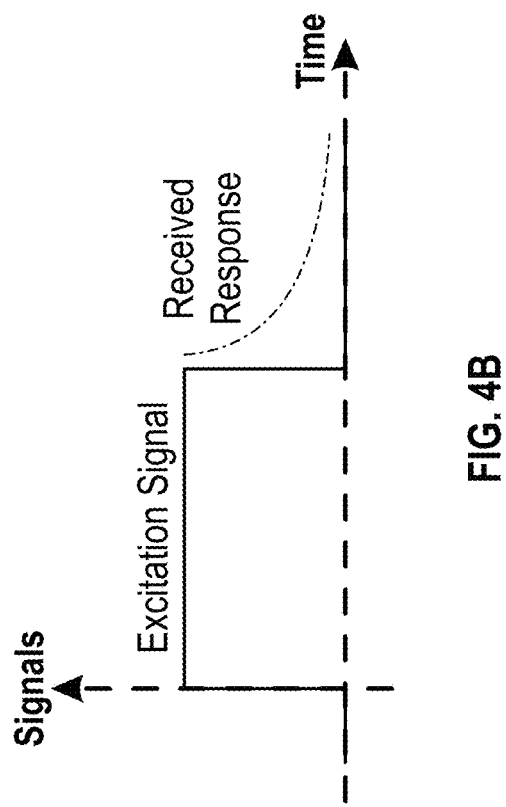
FIGS. 4A and 4B illustrates the limitation of a time-domain inspection tool and its associated defective response, respectively.
Figure 4A:
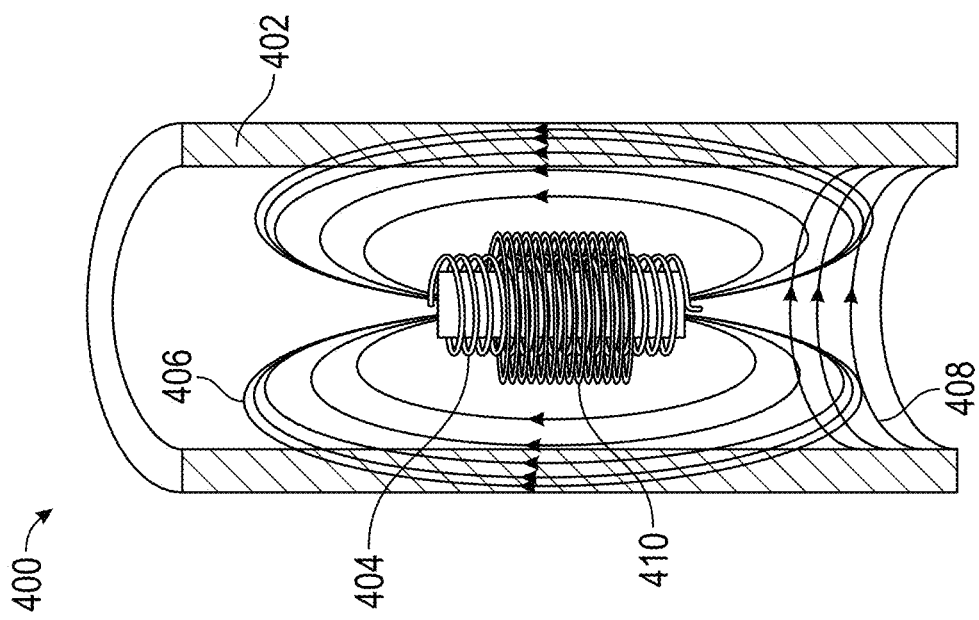

FIGS. 4A and 4B illustrates the limitation of a time-domain inspection tool and its associated defective response, respectively. In this case, the adjustable tool parameters include transmitter/receiver lengths, excitation current power, excitation pulse duration, excitation pule slew rate, decay response recording time duration, decay response sampling rate, and logging speed. In this example, a time domain inspection tool 400 is positioned inside a downhole pipe 402. In time-domain eddy current techniques (also referred to as pulsed eddy current or PEC), transmitter 404 is fed by a pulse. Similar to the frequency-domain technique, transient primary fields 406 are produced due to the transition of the pulse from "off" to "on" state or from "on" to "off" state. These transient fields 406 produce eddy currents 408 in the pipes 402. The eddy currents 408 then produce secondary magnetic fields (not shown) that are measured by either a separate receiver coil placed further away from transmitter 404 (not shown), a separate receiver coil 410 co-located with transmitter 404, or the same coil that was used as the transmitter (not shown). As shown in FIG. 4B, the decay response (received response) is measured with the receiver coil 410. The response consists of wideband data.

Figure 5A:
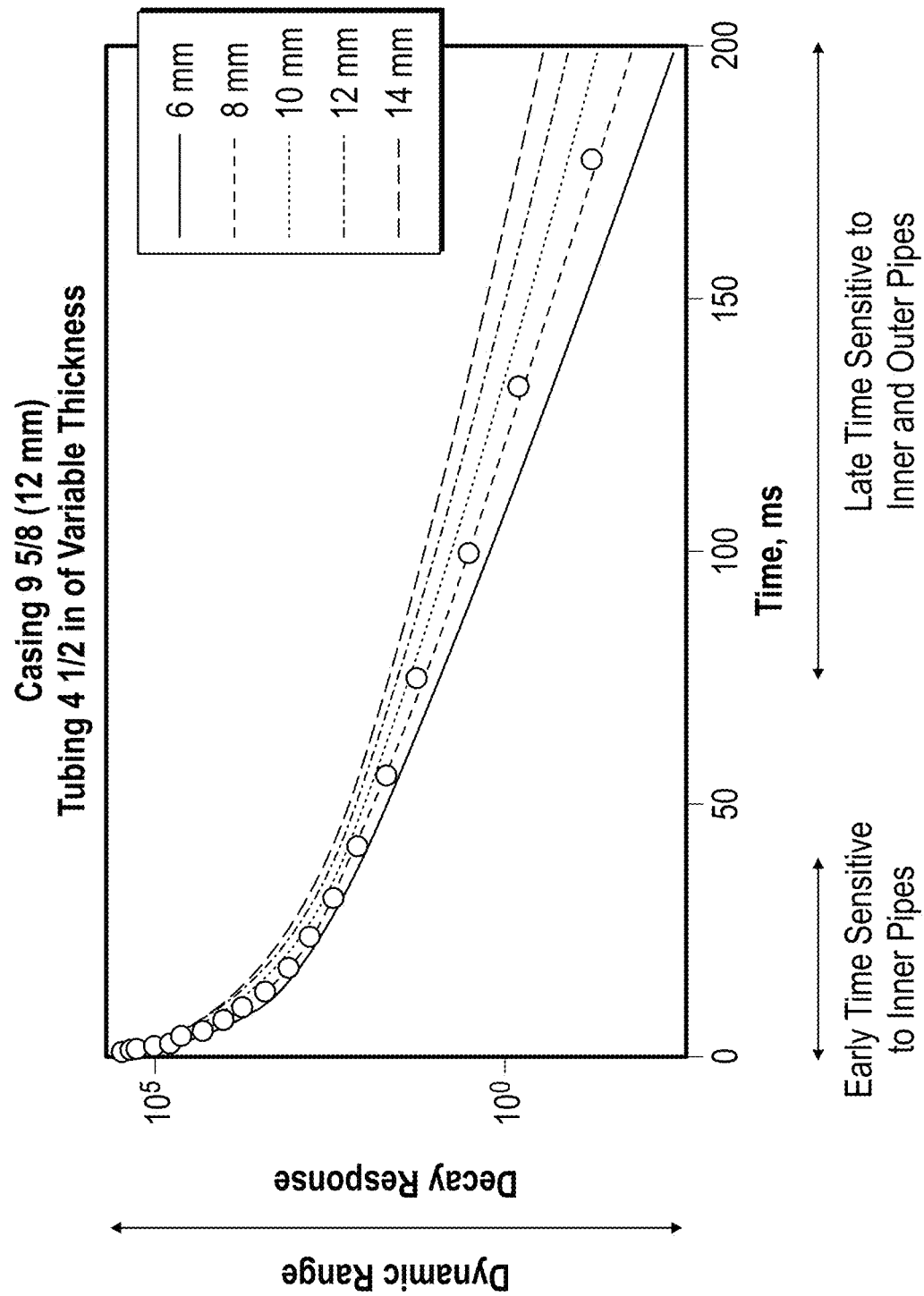
FIGS. 5A and 5B are graphs showing the dynamic range to two illustrative time-domain tools.
Figures 5B, 6:
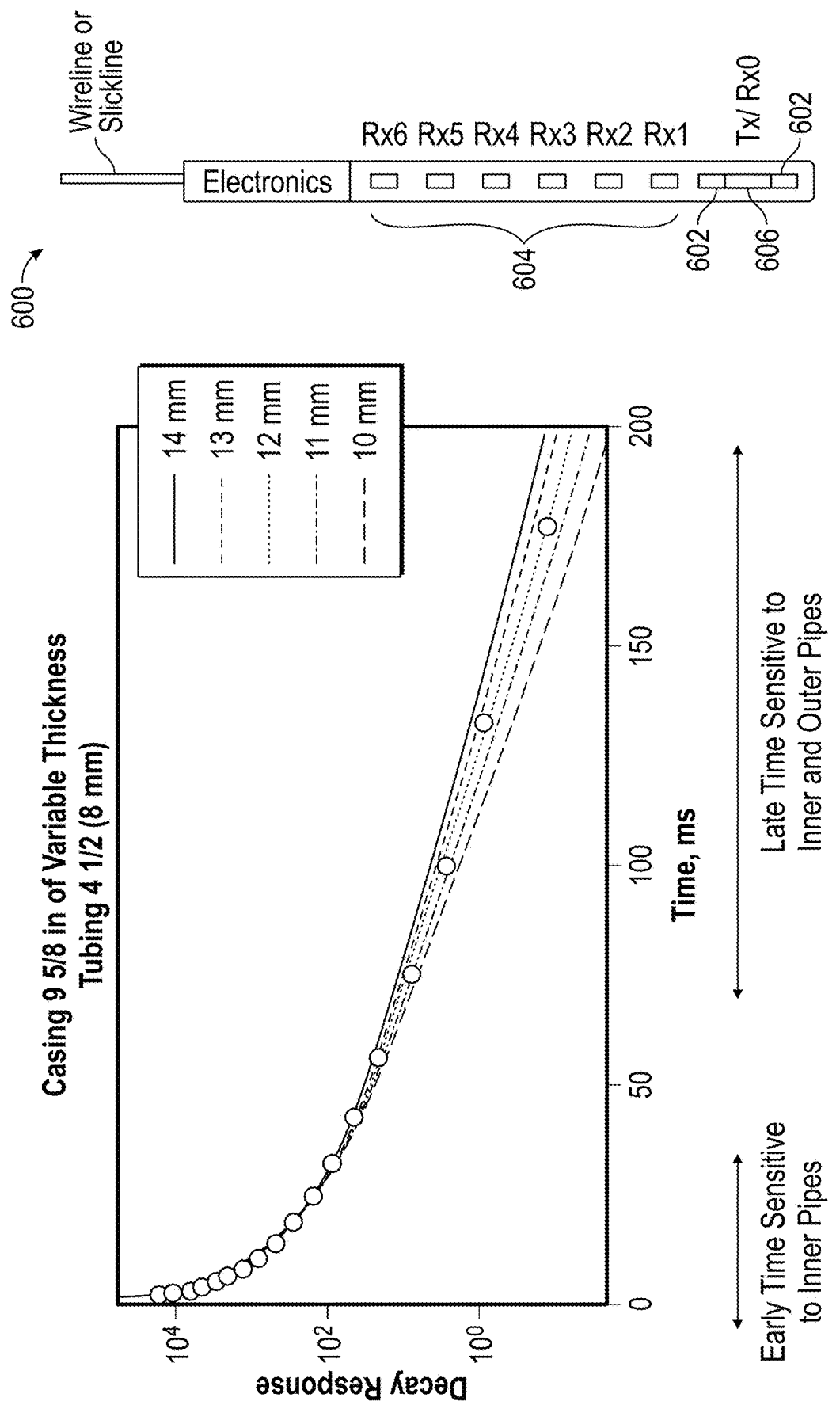
FIG. 6 is a diagram of a hybrid tool, according to certain illustrative embodiments of the present disclosure.
Figure 9:
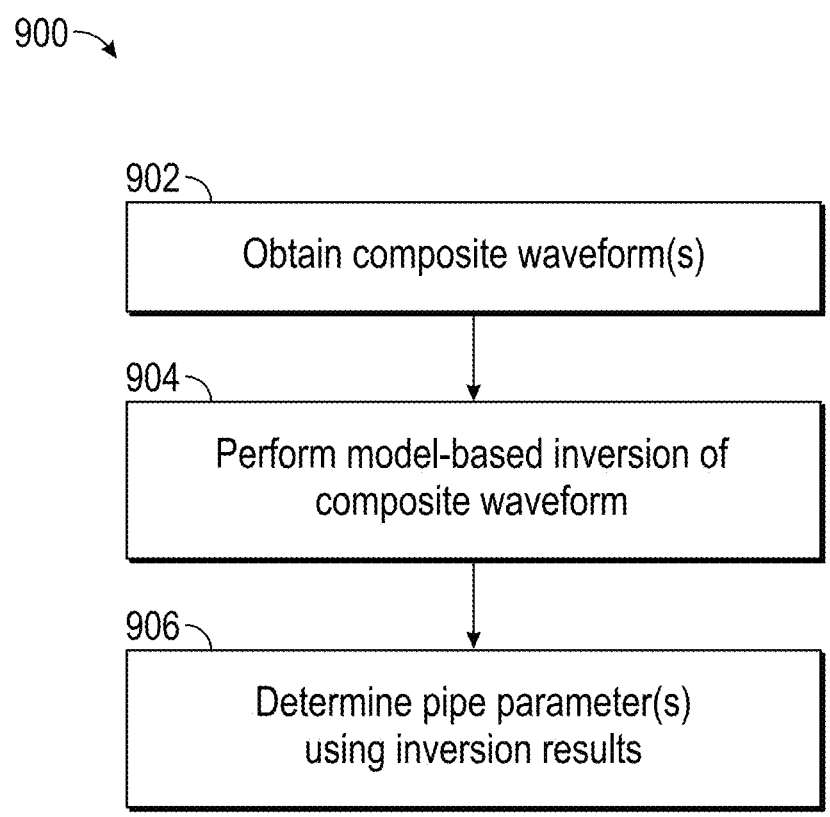
FIG. 9 is a method to inspect nested pipes, according to certain illustrative methods of the present disclosure.

FIGS. 5A and 5B are graphs showing the limitations of time-domain tools. FIG. 5A is a graph of a tool inside nested pipes having of a casing thickness ranging from 6-14 mm, while FIG. 5B is a graph of a tool inside nested pipes having a thickness ranging from 14-10 mm. The limitation is the excessively large dynamic range required to sample the decay response. A typical time-domain decay response has a dynamic range of 100 dB to 120 dB to cover both inner and outer pipes. The SNR for the outer pipes can be in the range of −20 dB to −40 dB, as shown in FIGS. 5A-5B. Such a large dynamic range is prohibitive because it requires costly electronics which limits the number of pipes a time-domain tool can resolve to 3 or 4 pipes. Note the model reflected in FIGS. 5A and 5B are two pipes. The OD of these two pipes are 4½" and 9⅝". FIG. 5A, 9⅝" pipe has 12 mm thickness, while 4½" varies pipe thickness between 6 and 12 mm. FIG. 5B, 4½" pipe has 8 mm thickness, while 9⅝" varies pipe thickness between 10 and 14 mm.

To overcome the limitations of the conventional inspection tools, embodiments of the present disclosure provide hybrid frequency- and time-domain inspection tools and associated processing workflows. FIG. 6 is a diagram of a hybrid tool, according to certain illustrative embodiments of the present disclosure. Hybrid tool 600 includes one or more transmitter coils 602 and one or more receivers 604 axially spaced from transmitter 602. In this example, receiver(s) 604 are configured to measure the responses (amplitude and phase or real and imaginary) at one or more frequencies in the continuous wave excitation (frequency-domain). Hybrid inspection tool 600 also includes transmitter electronics/controller and at least one receiver 606 co-located with transmitter 602. Receiver 606 is configured to measure the decay response of the excitation pulse (time-domain measurement). A signal generator (may be part of the controller) communicably coupled to transmitter 602 excites the transmitter coil 602 with a composite waveform comprising a continuous wave (with at least one frequency) and a pulse. Receiver circuitry is coupled to receiver 604 to record the receiver voltage in response to the excitation waveform. A processing unit then determines pipe parameters based on the recorded receiver voltage.

Figure 7:
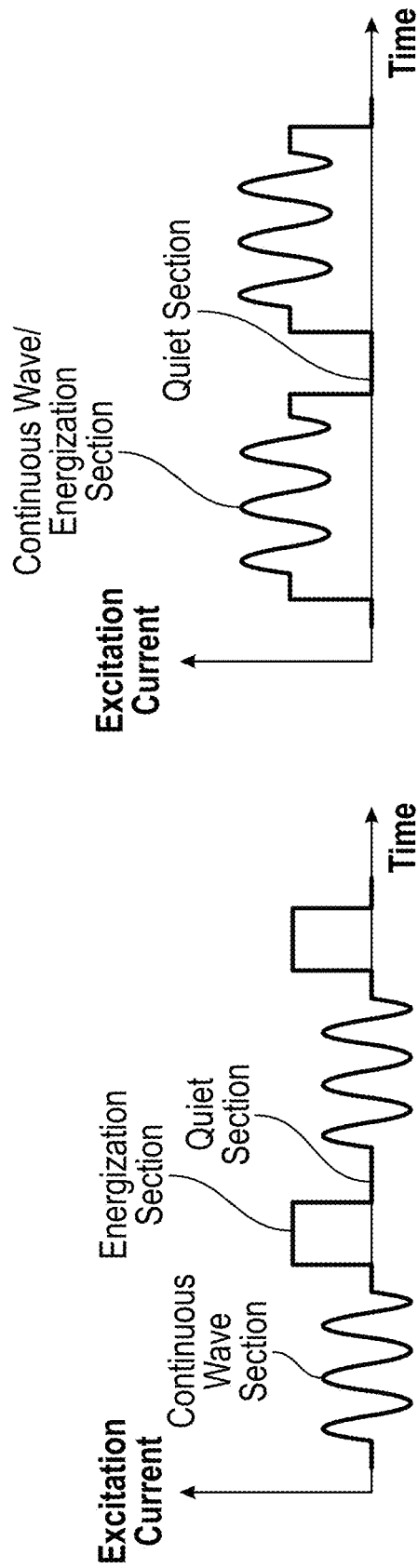
FIGS. 7A and 7B are examples of composite waveforms, according to certain illustrative embodiments of the present disclosure.

FIGS. 7A and 7B are examples of composite waveforms, according to certain illustrative embodiments of the present disclosure. In FIG. 7A, the continuous waveform includes a continuous wave section, followed by a energization section, followed by a quiet section, which then repeats. In FIG. 7B, the continuous waveform includes a combined continuous wave section/energization section, followed by a quiet section, which then repeats. The receiver circuitry decouples the frequency- and time-domain measurements from the composite waveforms.

Figure 8:
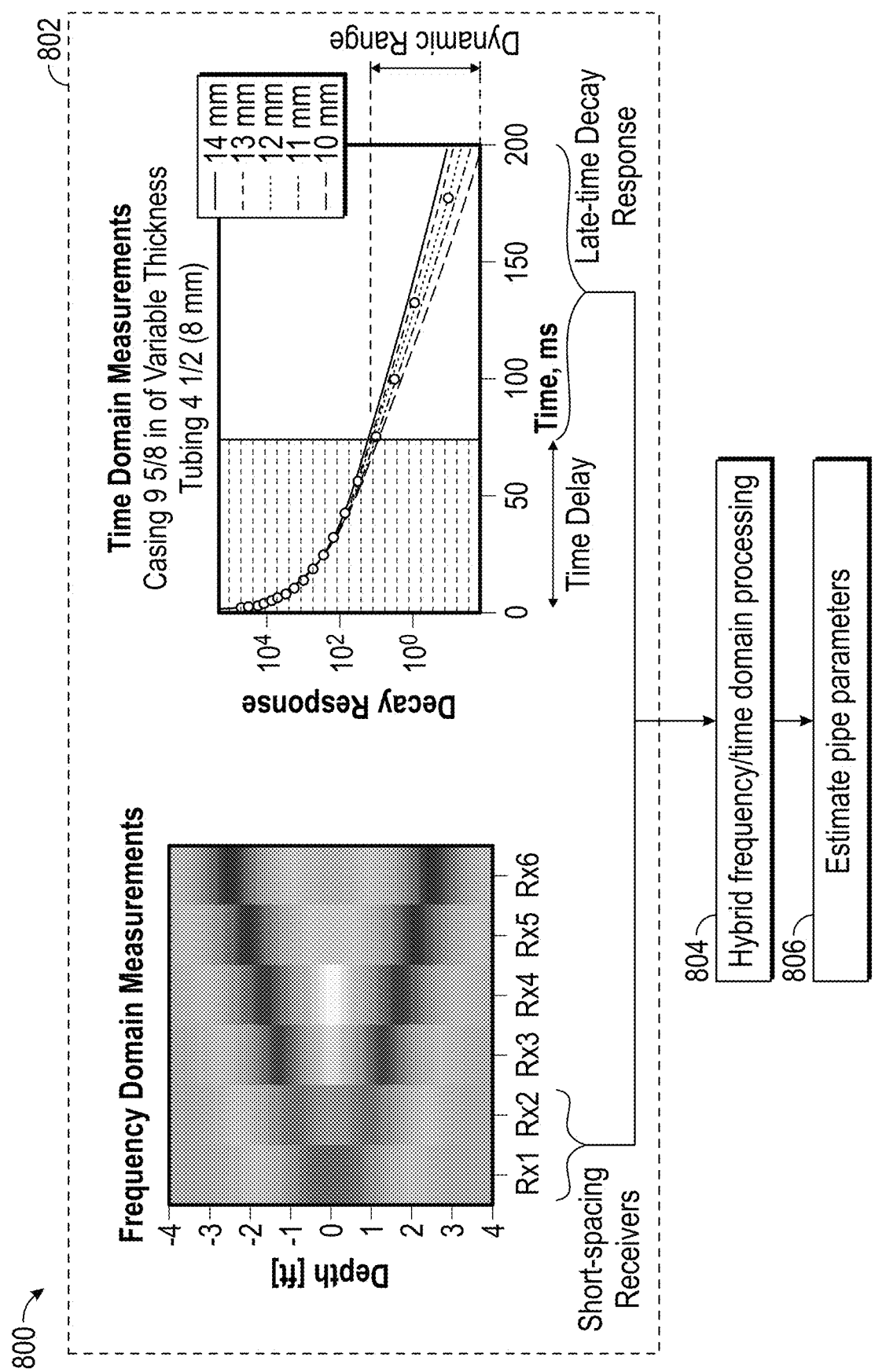
FIG. 8 is a diagram of a processing workflow of a hybrid processing method, according to certain illustrative methods of the present disclosure.

FIG. 8 is a diagram of a processing workflow 800 of a hybrid processing method, according to certain illustrative methods of the present disclosure. The well has been logged with a hybrid pipe inspection tool capable of making both frequency-domain and time-domain measurements, as described herein. Although the tool described herein is a hybrid tool, in other examples the inspection tool could be two separate frequency-domain and time-domain tools. In either example, the systems will apply the hybrid processing workflows described herein.

At block 802, after the frequency- and time-domain measurements are obtained, they are recorded. Next, the transmitter-receiver spacings are adjusted such that the frequency-domain measurements are primarily sensitive to inner pipes. This spacing adjustment can be performed by the controller circuitry, in certain examples, by only selecting the short-spacing receiver Rx1 and Rx2 (typically in the range less than 3 ft) responses for further processing in the workflow.

The time-domain measurements are sensitive to both inner and outer pipes by sampling the decay response of the excitation pulse starting at a prescribed time delay from the excitation pulse falling edge. In other illustrative embodiments, the decay response of the excitation pulse is sampled within a defined time interval from a falling edge of the excitation pulse. The time delay is adjusted such that the dynamic range of the portion of the decay response that is sensitive to both inner and outer pipes is within the resolvable dynamic range of the tool, as shown in FIG. 8.

Thereafter at block 804, the selected frequency- and time-domain measurements are jointly processed using model-based inversion. The inversion model is a hybrid model that predicts both frequency-domain and time-domain responses for a given set of pipe parameters.

In another illustrative embodiment, frequency-domain measurements are converted to time-domain equivalent responses using a frequency-to-time transform (e.g. Inverse Fourier transform). The equivalent time-domain response is then combined with the time-domain measurements to form a composite time-domain response. The composite time-domain response is then processed using time-domain-based inversion. The time-domain-based inversion makes use of a solver to find an optimal solution which can match best with the time-lapse measurement data. In certain illustrative embodiments, the solver can be a machine-learning based algorithm or an optimization solver.

In yet another illustrative embodiment, the time-domain measurements are converted to frequency-domain equivalent responses using a time-to-frequency transform (e.g. Fourier transform). The equivalent frequency-domain response is combined with the frequency-domain measurements to form a composite frequency-domain response. The composite frequency-domain response is then processed using frequency-domain-based inversion. The frequency-domain-based inversion makes use of a solver to find an optimal solution which can match best with the measurement data for all frequency channels. The solver can be, for example, a machine-learning based algorithm or an optimization solver.

Thereafter, in either method, the pipe parameters are then determined based upon the inversion results at block 806. Pipe parameters may include, for example, one or more of the following: the individual thickness of each pipe, percentage metal loss or gain of each pipe, the individual magnetic permeability of each pipe, the individual electrical conductivity of each pipe, the total thickness of all pipes, the eccentricity of each pipe or the ID of each pipe. The casing string can then be repaired or otherwise remediated accordingly.

FIG. 9 is a method to inspect nested pipes, according to certain illustrative methods of the present disclosure. At block 902 of method 900, an EM pipe inspection tool of the present disclosure is used to obtain one or more composite waveforms. The composite waveforms include a continuous wave response in the frequency domain and a pulse response in the time domain. At block 904, a system controller processes the composite waveform using model-based inversion. At block 906, the system controller (or other processing circuitry) determines one or more pipe parameters based upon the model-based inversion.

Figure 10:
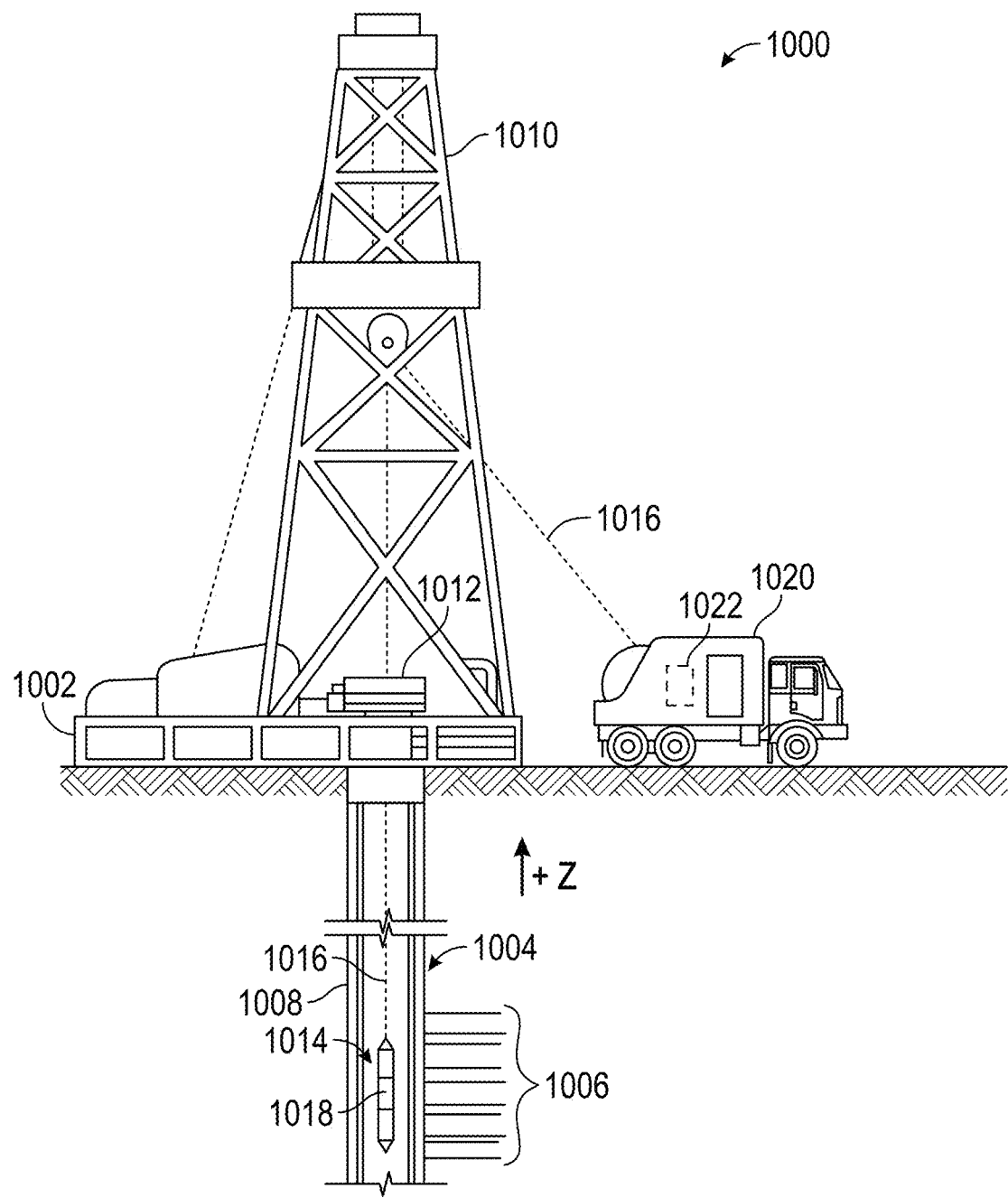
FIG. 10 illustrates an exemplary diagrammatic view of a conveyance logging wellbore operating environment in which the present disclosure may be implemented.

FIG. 10 illustrates a diagrammatic view of a conveyance logging wellbore operating environment 1000 (also referred to as "wireline" in the field) in which the present disclosure may be implemented. As depicted in FIG. 10, the wireline system 1000 may include a surface platform 1002 positioned at the Earth's surface and a wellbore 1004 that extends from the surface platform 1002 into one or more subterranean formations 1006. In other embodiments, such as in offshore operations, a volume of water may separate the surface platform 1002 and the wellbore 1004. The wellbore 1004 may be lined with one or more pipes 1008, also referred to as strings of casing. In some embodiments, portions of the wellbore 1004 may have only one pipe 1008 positioned therein, but other portions of the wellbore 1004 may be lined with two or more concentrically disposed pipes 1008. The pipes 1008 may be made of plain carbon steel, stainless steel, or another material capable of withstanding a variety of forces, such as collapse, burst, and tensile failure.

The wireline system 1000 may include a derrick 1010 supported by the surface platform 1002 and a wellhead installation 1012 positioned at the top of the wellbore 1004. A pipe inspection tool 1014, according to any of the illustrative embodiments described herein, may be suspended into the wellbore 1004 on a cable 1016. In some embodiments, the pipe inspection tool 1014 may alternatively be suspended within production tubing or pipe (not shown) positioned within the pipes 1008 that line the wellbore 1004 (i.e., casing). In such embodiments, the production tubing may extend by itself into the pipes 1008 or alternatively be positioned adjacent one or more eccentrically located production pipes that are also positioned within the pipes 1008. Accordingly, the pipes 1008 may refer to strings of casing lining the wellbore 1004 or at least one production pipe extended within casing that lines the wellbore 1004.

The pipe inspection tool 1014 may be any of the illustrative inspection tools described herein. For example, the pipe inspection tool 1014 may comprise one of a frequency-domain Eddy current tool or a time-domain Eddy current tool. Accordingly, its operation may be based on either the flux-leakage principle or the eddy-current principle, or a combination of both. Moreover, the pipe inspection tool 1014 may be insensitive to non-conductive deposits and is operable irrespective of the nature of the fluid mixture flowing into/out of the wellbore 1004. The pipe inspection tool 1014 can be used for the detection of various features associated with the pipes 1008, such as, but not limited to, a pipe collar, a metal gain region, a metal loss region, a deformed region, one or more perforations defined in the pipes 1008, localized damage, a defect, and corrosion in the pipes 1008. Such features can either be man-made or caused by corrosion.

In operation, the pipe inspection tool 1014 subjects the pipes 1008 to a strong static magnetic field using one or more transmitters and, due to the ferromagnetic nature of the pipes 1008, the magnetic return flux is mainly confined to the inside of the pipes 1008. In the presence of discontinuities or defects in the metal, such as any of the features listed above, changes in the magnetic field can be detected with one or more electromagnetic sensors 1018 included in the pipe inspection tool 1014.

The electromagnetic sensors 1018 may be communicably coupled to the cable 1016, which may include conductors for conveying power to the pipe inspection tool 1014 and also for facilitating communication between the surface platform 1002 and the pipe inspection tool 1014. A logging facility 1020, shown in FIG. 10 as a truck, may collect measurements obtained by the electromagnetic sensors 1018, and may include computing devices 1022 for controlling, processing, storing, and/or visualizing the measurements gathered by the electromagnetic sensors 1018. The computing devices 1022 may be communicably coupled to the pipe inspection tool 1014 by way of the cable 1016. The computing devices 1022 is capable of carrying out the methods and techniques of the present disclosure.

The electromagnetic sensors 1018 may include one or more electromagnetic coil antennas that may be used as transmitters, receivers, or a combination of both (i.e., transceivers) for obtaining in situ measurements of the pipe(s) 1008. In some embodiments, the electromagnetic sensors 1018 may be designed to operate in a centralized position within the innermost pipe 1008, such as through the use of one or more centralizers (not shown) attached to the body of the pipe inspection tool 1014. In other embodiments, however, the electromagnetic sensors 1018 may be designed to be adjacent or in intimate contact with the inner wall of the innermost pipe 1008. In such embodiments, the electromagnetic sensors 1018 may be mounted on one or more deployable sensor pads (not shown) positioned on actuatable arms that move the electromagnetic sensors 1018 radially outward toward the inner wall of the innermost pipe 1008.

Figure 11:
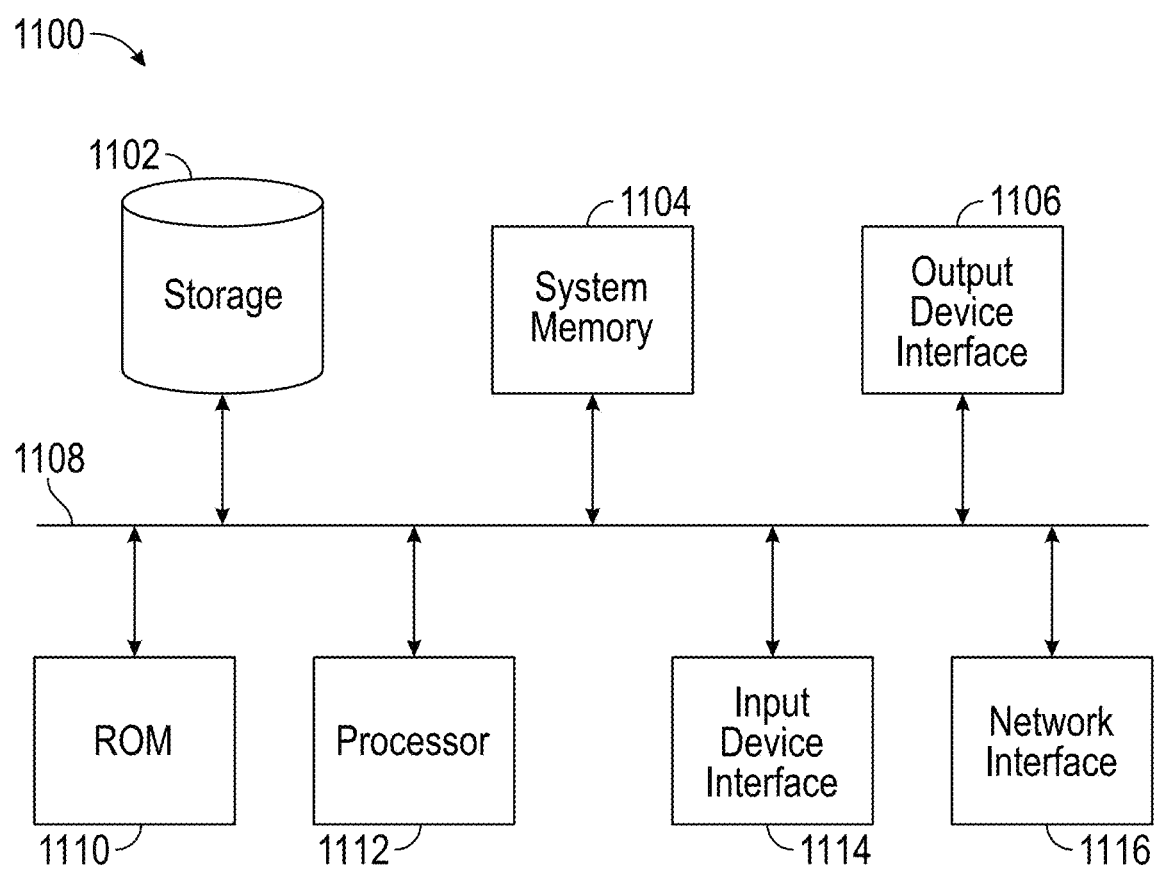
FIG. 11 is a block diagram of an exemplary computer system in which embodiments of the present disclosure may be implemented.

FIG. 11 is a block diagram of an exemplary computer system 1100 in which embodiments of the present disclosure may be implemented. System 1100 can be a computer, phone, PDA, or any other type of electronic device. Such an electronic device includes various types of computer readable media and interfaces for various other types of computer readable media. As shown in FIG. 11, system 1100 includes a permanent storage device 1102, a system memory 1104, an output device interface 1106, a system communications bus 1108, a read-only memory (ROM) 1110, processing unit(s) 1112, an input device interface 1114, and a network interface 1116.

Bus 1108 collectively represents all system, peripheral, and chipset buses that communicatively connect the numerous internal devices of system 1100. For instance, bus 1108 communicatively connects processing unit(s) 1112 with ROM 1110, system memory 1104, and permanent storage device 1102.

From these various memory units, processing unit(s) 1112 retrieves instructions to execute and data to process in order to execute the processes of the subject disclosure. The processing unit(s) can be a single processor or a multi-core processor in different implementations.

ROM 1110 stores static data and instructions that are needed by processing unit(s) 1112 and other modules of system 1100. Permanent storage device 1102, on the other hand, is a read-and-write memory device. This device is a non-volatile memory unit that stores instructions and data even when system 1100 is off. Some implementations of the subject disclosure use a mass-storage device (such as a magnetic or optical disk and its corresponding disk drive) as permanent storage device 1102.

Other implementations use a removable storage device (such as a floppy disk, flash drive, and its corresponding disk drive) as permanent storage device 1102. Like permanent storage device 1102, system memory 1104 is a read-and-write memory device. However, unlike storage device 1102, system memory 1104 is a volatile read-and-write memory, such a random access memory. System memory 1104 stores some of the instructions and data that the processor needs at runtime. In some implementations, the processes of the subject disclosure are stored in system memory 1104, permanent storage device 1102, and/or ROM 1110. For example, the various memory units include instructions for computer aided pipe string design based on existing string designs in accordance with some implementations. From these various memory units, processing unit(s) 1112 retrieves instructions to execute and data to process in order to execute the processes of some implementations.

Bus 1108 also connects to input and output device interfaces 1114 and 1106. Input device interface 1114 enables the user to communicate information and select commands to the system 1100. Input devices used with input device interface 1114 include, for example, alphanumeric, QWERTY, or T9 keyboards, microphones, and pointing devices (also called "cursor control devices"). Output device interfaces 1106 enables, for example, the display of images generated by the system 1100. Output devices used with output device interface 1106 include, for example, printers and display devices, such as cathode ray tubes (CRT) or liquid crystal displays (LCD). Some implementations include devices such as a touchscreen that functions as both input and output devices. It should be appreciated that embodiments of the present disclosure may be implemented using a computer including any of various types of input and output devices for enabling interaction with a user. Such interaction may include feedback to or from the user in different forms of sensory feedback including, but not limited to, visual feedback, auditory feedback, or tactile feedback. Further, input from the user can be received in any form including, but not limited to, acoustic, speech, or tactile input. Additionally, interaction with the user may include transmitting and receiving different types of information, e.g., in the form of documents, to and from the user via the above-described interfaces.

Also, as shown in FIG. 11, bus 1108 also couples system 1100 to a public or private network (not shown) or combination of networks through a network interface 1116. Such a network may include, for example, a local area network ("LAN"), such as an Intranet, or a wide area network ("WAN"), such as the Internet. Any or all components of system 1100 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself. Accordingly, the steps of processes described above may be implemented using system 600 or any computer system having processing circuitry or a computer program product including instructions stored therein, which, when executed by at least one processor, causes the processor to perform functions relating to these methods.

As used in this specification and any claims of this application, the terms "computer", "server", "processor", and "memory" all refer to electronic or other technological devices. These terms exclude people or groups of people. As used herein, the terms "computer readable medium" and "computer readable media" refer generally to tangible, physical, and non-transitory electronic storage mediums that store information in a form that is readable by a computer.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., a web page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In view of the foregoing, the hybrid inspection tools and methods disclosed herein will provide a high resolution tools in comparison to conventional tools. The disclosed hybrid tools will provide higher resolution than conventional frequency-domain tools, and with much less stringent dynamic range and SNR requirements than conventional time-domain tools. Further, the hybrid tools and methods disclosed herein will be visible to operators since the excitation current and raw data representation will be hybrids of frequency-domain and time-domain signals.

Embodiments and methods of the present disclosure described herein further relate to any one or more of the following paragraphs:

1. A method to inspect nested pipes within a downhole wellbore, the method comprising obtaining, using an electromagnetic pipe inspection tool positioned within the pipes, one or more composite waveforms having: a continuous wave response in the frequency domain; and a pulse response in the time domain; processing the composite waveform using model-based inversion; and determining at least one pipe parameter based upon the model-based inversion.

2. The method as defined in paragraph 1, wherein obtaining the composite waveforms comprises sampling a decay response of the pulse response starting at a defined time delay from a falling edge of an excitation pulse, the time delay being selected such that a dynamic range of a portion of the decay response is within a resolvable dynamic range of the pipe inspection tool.

3. The method as defined in paragraphs 1 or 2, wherein obtaining the composite waveforms comprises sampling a decay response of the pulse response within a defined time interval from a falling edge of an excitation pulse, the time interval being selected such that a dynamic range of a portion of the decay response is within a resolvable dynamic range of the pipe inspection tool.

4. The method as defined in any of paragraphs 1-3, wherein inner pipes are measured using the frequency domain and outer pipes are measured using the time domain.

5. The method as defined in any of paragraphs 1-4, wherein inner pipes are measured using the time domain and outer pipes are measured using the frequency domain.

6. The method as defined in any of paragraphs 1-5, wherein the frequency domain responses are acquired using short-spacing receivers for which a change in an inner pipe thickness causes a substantially larger change in receiver signal as compared to a similar change in an outer pipe thickness.

7. The method as defined in any of paragraphs 1-6, wherein the frequency domain responses are acquired using long-spacing receivers for which a change in an outer pipe thickness causes a substantially equal or larger change in receiver signal as compared to a similar change in an inner pipe thickness.

8. The method as defined in any of paragraphs 1-7, wherein the model-based inversion applies a hybrid model that predicts both frequency-domain and time-domain responses for a set of pipe parameters.

9. The method as defined in any of paragraphs 1-8, wherein processing the composite waveforms comprises converting the continuous wave response to a time-domain equivalent response using a frequency-to-time transform; combining the time-domain equivalent response with the pulse response to form a composite time-domain response; and processing the composite time-domain response using time domain-based inversion.

10. The method as defined in any of paragraphs 1-9, wherein processing the composite waveforms comprises converting the pulse response to a frequency-domain equivalent response using a time-to-frequency transform; combining the frequency-domain equivalent response with the continuous wave response to form a composite frequency-domain response; and processing the composite frequency-domain response using frequency domain-based inversion.

11. A non-transitory computer program product including instructions which, when executed by at least one processor, causes the processor to a method comprising obtaining, using an electromagnetic pipe inspection tool positioned within the pipes, one or more composite waveforms having a continuous wave response in the frequency domain; and a pulse response in the time domain; processing the composite waveform using model-based inversion; and determining at least one pipe parameter based upon the model-based inversion.

12. The computer program product as defined in paragraph 11, wherein obtaining the composite waveforms comprises sampling a decay response of the pulse response starting at a defined time delay from a falling edge of an excitation pulse, the time delay being selected such that a dynamic range of a portion of the decay response is within a resolvable dynamic range of the pipe inspection tool.

13. The computer program product as defined in paragraphs 11 or 12, wherein obtaining the composite waveforms comprises sampling a decay response of the pulse response within a defined time interval from a falling edge of an excitation pulse, the time interval being selected such that a dynamic range of a portion of the decay response is within a resolvable dynamic range of the pipe inspection tool.

14. The computer program product as defined in any of paragraphs 11-13, wherein the model-based inversion applies a hybrid model that predicts both frequency-domain and time-domain responses for a set of pipe parameters.

15. The computer program product as defined in any of paragraphs 11-14, wherein processing the composite waveforms comprises converting the continuous wave response to a time-domain equivalent response using a frequency-to-time transform; combining the time-domain equivalent response with the pulse response to form a composite time-domain response; and processing the composite time-domain response using time domain-based inversion.

16. The computer program product as defined in any of paragraphs 11-15, wherein processing the composite waveforms comprises converting the pulse response to a frequency-domain equivalent response using a time-to-frequency transform; combining the frequency-domain equivalent response with the continuous wave response to form a composite frequency-domain response; and processing the composite frequency-domain response using frequency domain-based inversion.

17. A system to inspect nested pipes within a downhole wellbore, the system comprising a pipe inspection tool comprising: at least one transmitter; a signal generator which excites the transmitter to generate a composite waveform having: a continuous wave response in the frequency domain; and a pulse response in the time domain; and a receiver to obtain a measurement of the composite waveform; and processing circuitry to perform model-based inversion of the composite waveform measurement and determine at least one pipe parameter.

18. The system as defined in paragraph 17, wherein the receiver is axially spaced from the transmitter and operable to measure responses at one or more frequencies of the continuous wave; or receiver is co-located with the transmitter and operable to measure a decay response of the pulse response.

19. The system as defined in paragraphs 17 or 18, wherein the receiver is operable to measure amplitude and phase or real and imaginary responses.

20. The system as defined in any of paragraphs 17-19, wherein the composite waveform has a continuous wave section, an energization section, and a quiet section.

Furthermore, the exemplary methodologies described herein may be implemented by a system including processing circuitry or a non-transitory computer program product including instructions which, when executed by at least one processor, causes the processor to perform any of the methodology described herein.

Although various embodiments and methodologies have been shown and described, the invention is not limited to such embodiments and methodologies and will be understood to include all modifications and variations as would be apparent to one skilled in the art. Therefore, it should be understood that the invention is not intended to be limited to the particular forms disclosed. Rather, the intention is to cover all modifications, equivalents and alternatives falling within the spirit and scope of the invention as defined by the appended claims.

What is claimed is:

1. A method to inspect nested pipes within a downhole wellbore, the method comprising:

obtaining, using an electromagnetic pipe inspection tool positioned within the pipes, one or more composite waveforms having:
a continuous wave response in the frequency domain; and
a pulse response in the time domain, wherein the electromagnetic pipe inspection tool comprises at least one transmitter and at least one receiver, wherein at least one receiver is axially spaced from at least one transmitter and operable to measure responses at one or more frequencies of the continuous wave; and at least one receiver is co-located with the at least one transmitter and operable to measure a decay response of a pulse response;
processing the composite waveform using model-based inversion, wherein the model-based inversion is a hybrid model that predicts a set of pipe parameters from both frequency-domain and time-domain responses; and
determining at least one pipe parameter based upon the matching between the obtained continuous wave response in the frequency domain; and the obtained pulse response in the time domain and the predicted frequency-domain and time-domain responses of at least one pipe parameter.

2. The method as defined in claim 1, wherein obtaining the composite waveforms comprises sampling a decay response of the pulse response starting at a defined time delay from a falling edge of an excitation pulse, the time delay being selected such that a dynamic range of a portion of the decay response is within a resolvable dynamic range of the pipe inspection tool.

3. The method as defined in claim 1, wherein obtaining the composite waveforms comprises sampling a decay response of the pulse response within a defined time interval from a falling edge of an excitation pulse, the time interval being selected such that a dynamic range of a portion of the decay response is within a resolvable dynamic range of the pipe inspection tool.

4. The method as defined in claim 2, wherein inner pipes are measured using the frequency domain and outer pipes are measured using the time domain.

5. The method as defined in claim 3, wherein inner pipes are measured using the time domain and outer pipes are measured using the frequency domain.

6. The method as defined in claim 2, wherein the frequency domain responses are acquired using short-spacing receivers for which a change in an inner pipe thickness causes a substantially larger change in receiver signal as compared to a similar change in an outer pipe thickness.

7. The method as defined in claim 3, wherein the frequency domain responses are acquired using long-spacing receivers for which a change in an outer pipe thickness causes a substantially equal or larger change in receiver signal as compared to a similar change in an inner pipe thickness.

8. The method as defined in claim 1, wherein the model-based inversion applies a hybrid model that predicts both frequency-domain and time-domain responses for a set of pipe parameters.

9. The method as defined in claim 1, wherein processing the composite waveforms comprises:
converting the continuous wave response to a time-domain equivalent response using a frequency-to-time transform;
combining the time-domain equivalent response with the pulse response to form a composite time-domain response; and
processing the composite time-domain response using time domain-based inversion.

10. The method as defined in claim 1, wherein processing the composite waveforms comprises:
converting the pulse response to a frequency-domain equivalent response using a time-to-frequency transform;
combining the frequency-domain equivalent response with the continuous wave response to form a composite frequency-domain response; and
processing the composite frequency-domain response using frequency domain-based inversion.

11. A non-transitory memory including instructions which, when executed by at least one processor, causes the processor to perform a method comprising:
obtaining, using an electromagnetic pipe inspection tool positioned within the pipes, one or more composite waveforms having:
a continuous wave response in the frequency domain; and
a pulse response in the time domain, wherein the electromagnetic pipe inspection tool comprises at least one transmitter and at least one receiver, wherein at least one receiver is axially spaced from at least one transmitter and operable to measure responses at one or more frequencies of the continuous wave; and at least one receiver is co-located with the at least one transmitter and operable to measure a decay response of a pulse response;
processing the composite waveform using model-based inversion, wherein the model-based inversion is a hybrid model that predicts a set of pipe parameters from both frequency-domain and time-domain responses; and
determining at least one pipe parameter based upon the matching between the obtained continuous wave response in the frequency domain; and the obtained pulse response in the time domain and the predicted frequency-domain and time-domain responses of at least one pipe parameter.

12. The computer program product as defined in claim 11, wherein obtaining the composite waveforms comprises sampling a decay response of the pulse response starting at a defined time delay from a falling edge of an excitation pulse, the time delay being selected such that a dynamic range of a portion of the decay response is within a resolvable dynamic range of the pipe inspection tool.

13. The computer program product as defined in claim 11, wherein obtaining the composite waveforms comprises sampling a decay response of the pulse response within a defined time interval from a falling edge of an excitation pulse, the time interval being selected such that a dynamic range of a portion of the decay response is within a resolvable dynamic range of the pipe inspection tool.

14. The computer program product as defined in claim 11, wherein the model-based inversion applies a hybrid model that predicts both frequency-domain and time-domain responses for a set of pipe parameters.

15. The computer program product as defined in claim 11, wherein processing the composite waveforms comprises:
converting the continuous wave response to a time-domain equivalent response using a frequency-to-time transform;

combining the time-domain equivalent response with the pulse response to form a composite time-domain response; and processing the composite time-domain response using time domain-based inversion.

16. The computer program product as defined in claim 11, wherein processing the composite waveforms comprises:

converting the pulse response to a frequency-domain equivalent response using a time-to-frequency transform;

combining the frequency-domain equivalent response with the continuous wave response to form a composite frequency-domain response; and processing the composite frequency-domain response using frequency domain-based inversion.

17. A system to inspect nested pipes within a downhole wellbore, the system comprising: a pipe inspection tool comprising:

at least one transmitter;

a signal generator which excites the transmitter to generate a composite waveform having:

a continuous wave response in the frequency domain; and a pulse response in the time domain; and a receiver to obtain a measurement of the composite waveform, wherein at least one receiver is axially spaced from at least one transmitter and operable to measure responses at one or more frequencies of the continuous wave; and at least one receiver is co-located with the at least one transmitter and operable to measure a decay response of a pulse response; and processing circuitry to perform model-based inversion of the composite waveform measurement and determine at least one pipe parameter, wherein the model-based inversion is a hybrid model that predicts a set of pipe parameters from both frequency-domain and time-domain responses.

18. The system as defined in claim 17, wherein the receiver is operable to measure amplitude and phase or real and imaginary responses.

19. The system as defined in claim 17, wherein the composite waveform has a continuous wave section, an energization section, and a quiet section.

20. The system as defined in claim 17, wherein at least one receiver configured to measure a decay response of an excitation pulse (time-domain measurement) is located in between two transmitters and at least one receiver configured to measure the responses (amplitude and phase) at one or more frequencies in a continuous wave excitation in the frequency-domain is located above the two transmitters.

\* \* \* \* \*